(12) United States Patent
Swenson

(10) Patent No.: US 10,171,871 B2
(45) Date of Patent: Jan. 1, 2019

(54) LOCATION PROFILING

(71) Applicant: DISH Technologies L.L.C., Englewood, CO (US)

(72) Inventor: Erik Joseph Swenson, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 78 days.

(21) Appl. No.: 14/532,398

(22) Filed: Nov. 4, 2014

(65) Prior Publication Data
US 2015/0189379 A1 Jul. 2, 2015

Related U.S. Application Data

(60) Provisional application No. 61/921,925, filed on Dec. 30, 2013.

(51) Int. Cl.
| | |
|---|---|
| *H04N 21/45* | (2011.01) |
| *H04N 21/258* | (2011.01) |
| *H04N 21/418* | (2011.01) |
| *H04N 21/442* | (2011.01) |
| *H04N 21/4623* | (2011.01) |
| *H04N 21/4627* | (2011.01) |
| *H04N 21/488* | (2011.01) |

(Continued)

(52) U.S. Cl.
CPC ..... *H04N 21/4524* (2013.01); *H04N 21/2585* (2013.01); *H04N 21/25841* (2013.01); *H04N 21/4181* (2013.01); *H04N 21/4182* (2013.01); *H04N 21/435* (2013.01); *H04N 21/438* (2013.01); *H04N 21/44236* (2013.01); *H04N 21/4623* (2013.01); *H04N 21/4627* (2013.01); *H04N 21/4882* (2013.01); *H04N 21/6143* (2013.01); *H04N 21/6334* (2013.01); *H04N 21/814* (2013.01); *H04N 21/2541* (2013.01); *H04N 21/658* (2013.01); *H04N 21/6543* (2013.01)

(58) Field of Classification Search
CPC ........ H04N 21/2541; H04N 21/25841; H04N 21/2585; H04N 21/4182
USPC .......................................................... 725/16
See application file for complete search history.

(56) References Cited

U.S. PATENT DOCUMENTS

| | | | |
|---|---|---|---|
| 6,266,813 B1 * | 7/2001 | Ihara ...................... | H04H 20/06 375/E7.024 |
| 6,741,834 B1 | 5/2004 | Godwin | |

(Continued)

FOREIGN PATENT DOCUMENTS

| | | | | |
|---|---|---|---|---|
| EP | 2 227 006 A1 | 9/2010 | | |
| WO | WO 2014120184 A1 * | 8/2014 | ............. | G06F 11/30 |

OTHER PUBLICATIONS

European Search Report for EP14198736 completed Mar. 13, 2015, 7 pages.

(Continued)

*Primary Examiner* — Nasser M Goodarzi
*Assistant Examiner* — Jaycee Imperial
(74) *Attorney, Agent, or Firm* — Kilpatrick Townsend & Stockton LLP

(57) ABSTRACT

One or more of a system, method, apparatus, and computer-program product to identify or approximate or estimate where a particular television receiver is geographically located using spot beam transport information as described in the specification and/or shown in any of the drawings.

20 Claims, 6 Drawing Sheets

(51) Int. Cl.
   *H04N 21/61*    (2011.01)
   *H04N 21/6334*  (2011.01)
   *H04N 21/435*   (2011.01)
   *H04N 21/438*   (2011.01)
   *H04N 21/81*    (2011.01)
   *H04N 21/254*       (2011.01)
   *H04N 21/6543*      (2011.01)
   *H04N 21/658*       (2011.01)

(56) References Cited

U.S. PATENT DOCUMENTS

| | | | |
|---|---|---|---|
| 7,831,659 B2* | 11/2010 | Endo | G06Q 10/06 358/1.16 |
| 8,887,307 B2 | 11/2014 | Chen | |
| 9,231,718 B2 | 1/2016 | Beals | |
| 2002/0078467 A1* | 6/2002 | Rosin | H04N 5/44543 725/110 |
| 2003/0145328 A1 | 7/2003 | Rabinowitz et al. | |
| 2005/0204389 A1* | 9/2005 | Proehl | H04N 21/6112 725/60 |
| 2006/0253877 A1* | 11/2006 | Hsu | H04N 21/4143 725/68 |
| 2007/0180231 A1 | 8/2007 | Morten | |
| 2008/0178226 A1 | 7/2008 | Lee | |
| 2009/0070828 A1 | 3/2009 | Stomakhin | |
| 2009/0160939 A1 | 6/2009 | Fernandez et al. | |
| 2009/0296000 A1 | 12/2009 | Pal | |
| 2011/0004893 A1* | 1/2011 | Borislow | H04N 7/165 725/25 |
| 2011/0047584 A1* | 2/2011 | Codadeen | H04N 7/1675 725/110 |
| 2011/0055862 A1 | 3/2011 | Harp et al. | |
| 2012/0131611 A1* | 5/2012 | Yeap | H04N 21/42202 725/35 |
| 2012/0204212 A1* | 8/2012 | Lester | H04B 7/18523 725/65 |
| 2013/0065610 A1 | 3/2013 | Attar et al. | |
| 2013/0201059 A1 | 8/2013 | Wengler et al. | |
| 2013/0232565 A1 | 9/2013 | O'Connor et al. | |
| 2014/0068778 A1 | 3/2014 | Bhatia et al. | |
| 2014/0282714 A1 | 9/2014 | Hussain | |
| 2014/0325551 A1 | 10/2014 | McMillan | |
| 2015/0046952 A1 | 2/2015 | Beals | |
| 2015/0370518 A1* | 12/2015 | Ramchandran | G06F 11/30 358/1.15 |
| 2016/0127752 A1 | 5/2016 | Beals | |

OTHER PUBLICATIONS

U.S. Appl. No. 13/962,198 Non Final Rejection dated May 12, 20158, 21 pages.

U.S. Appl. No. 13/962,198 Non Final Rejection dated Nov. 6, 2014, 22 pages.

U.S. Appl. No. 13/962,198 Notice of Allowance dated Sep. 10, 2015, 22 pages.

U.S. Appl. No. 14/958,658 Non-Final Rejection dated Jun. 8, 2016, 16 pages.

European Office Action for EP 14 198 736.2 dated Mar. 16, 2017, all pages.

Office Action for EP 14198736 dated Jan. 26, 2018, 3 pages.

* cited by examiner

LOCATION PROFILING

CROSS-REFERENCE TO RELATED APPLICATION

This application claims priority to U.S. Prov. App. Ser. No. 61/921,925, filed 30 Dec. 2013 and entitled LOCATION PROFILING, the entirety of which is hereby incorporated by reference for all intents and purposes.

BACKGROUND

A spot beam as discussed within the context of the present disclosure may refer to a particular satellite signal that is directed or projected towards a specific and precisely-defined region or area of the surface of the Earth. Among other things, a spot beam may allow a service provider to deliver more local channels to a particular region since an allocated frequency band associated with the spot beam may be reused across different geographically separated regions.

SUMMARY

In an aspect, a method may include or comprise receiving at a television receiver a command to access a listing that contains at least one transponder identifier that identifies a particular signal detected by the television receiver. The method may include or comprise querying based on the command a memory location of the television receiver that is associated with the listing, to obtain each transponder identifier within the listing. The method may include or comprise queuing a message that includes a representation of each transponder identifier within the listing for transmission over a network interface of the television receiver to a computing system that is configured to estimate geographic location of the television receiver based on each transponder identifier within the listing.

In an aspect, a television receiver is disclosed. The television receiver may include or comprise at least one processor. The television receiver may further include or comprise a smartcard coupled to the at least one processor and that is configured to receive an instruction to access a memory location of the television receiver that contains at least one transponder identifier that identifies a particular signal detected by the television receiver. The television receiver may further include or comprise a network interface coupled to the at least one processor and the smartcard and that is configured to transmit in a secure message a representation of the at least one transponder identifier over a network to a computing system that is configured to estimate geographic location of the television receiver based on the at least one transponder identifier within the secure message.

In an aspect, a non-transitory processor-readable medium is disclosed. The non-transitory processor-readable medium may include or comprise processor-readable instructions to cause one or more processors to detect receipt of a command at a television receiver to query a listing that contains at least one transponder identifier that identifies a particular signal detected by the television receiver. The non-transitory processor-readable medium may include or comprise processor-readable instructions to cause one or more processors to instantiate transmission of a secure message that includes a representation of each transponder identifier within the listing over a network to a computing system that is configured to approximate geographic location of the television receiver based on each transponder identifier within the listing.

In an aspect, one or more of a system, method, apparatus, and computer-program product is or are disclosed to identify or approximate or estimate where a particular television receiver is geographically located using spot beam transport information as described in the specification and/or shown in any of the drawings.

Other aspects are possible.

DETAILED DESCRIPTION

The present disclosure is directed to or towards using spot beam transport information to identify, approximately, where a particular television receiver is geographically located. In one example implementation, a smartcard in a television receiver may query the receiver to obtain a list of spot beam transports that the receiver has access to, possibly in response to a received command to do so. That spot beam transport information may then optionally be stored within the smartcard. Subsequently, in response to another received command, or possibly as part of an automated process, the smartcard may attempt to instantiate a process to report the spot beam transport information to a service provider over a network or phone connection as or within a secure message. When the message is received by the provider, the provider may derive or extrapolate where the receiver is geographically located, approximately, based on a geographical intersection of identified spot beam transports contained within the message. Derived location of the receiver is "approximate" because in many instances it may not be exactly precise. For example, the receiver may be determined or estimated to be located generally within a particular city or region, but not a particular household or location within the particular city or region. It is contemplated that such derived information may then be used for any of a number of different purposes. For example, the derived information may be used along with other information to identify accounts and/or television receivers being used for illegitimate purposes, as well to provide a troubleshooting service for legitimate customers. Although not so limited, an appreciation of the various aspects of the present disclosure may be gained from the following discussion in connection with the drawings.

Figure 1:
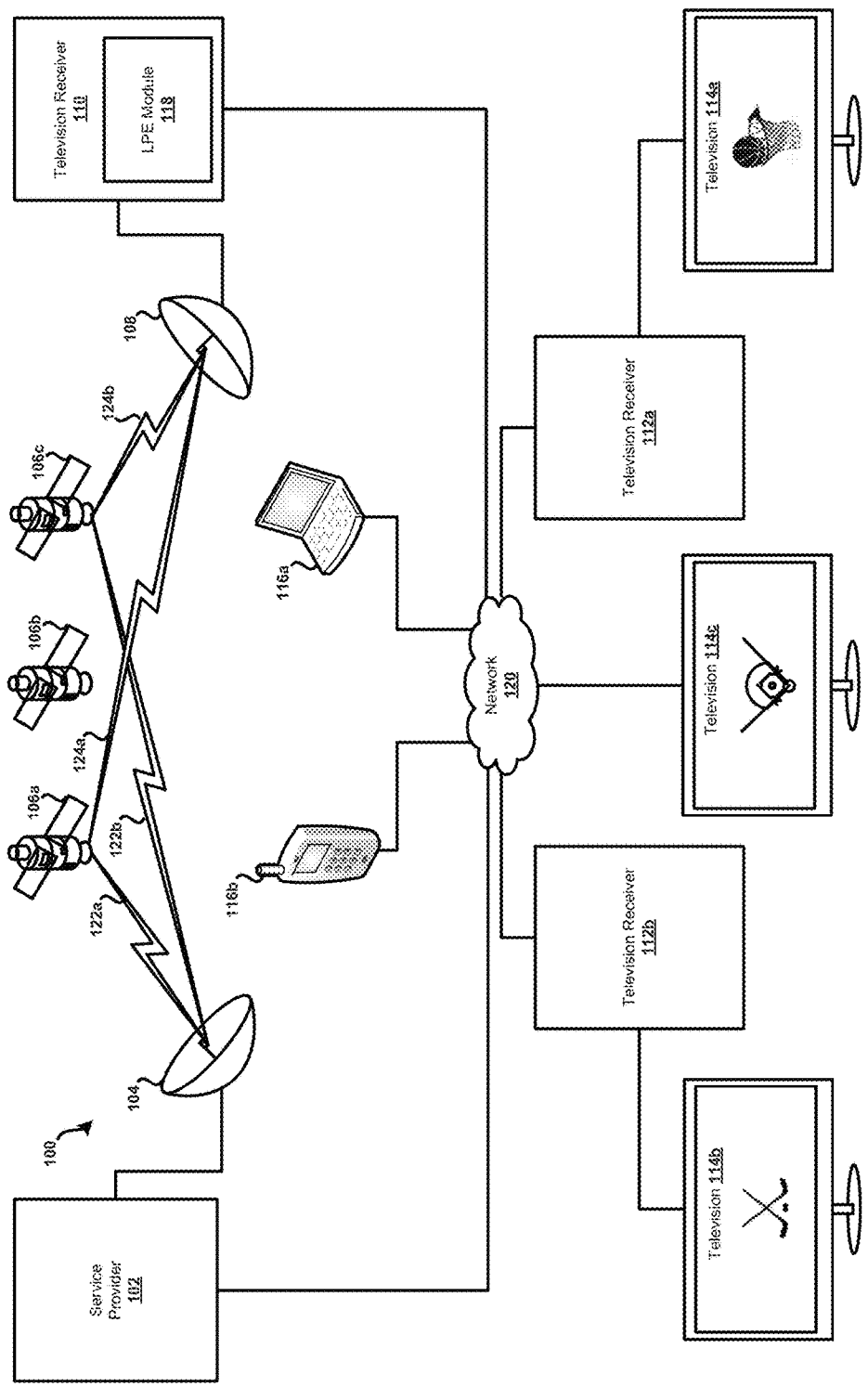
FIG. 1 shows an example system in accordance with the disclosure.

For instance, referring now to FIG. 1, an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of STRs (Secondary Television Receivers) 112a-b, a plurality of televisions 114a-c, and a plurality of computing devices 116a-b. In the present example, the PTR 110 may include a LPE (Location Profiling Engine) module 118. In general, and as discussed throughout, the LPE module 118 may be configured to query a memory location of the PTR 110 to obtain a list of spot beam transports that the PTR 110 has access to, possibly in response to a received command to do so. Subsequently, in response to another received command, or possibly as part of an automated process, the LPE module 118 may attempt to instantiate a process to report the spot beam transport information to the service provider 102 over at least one network 120 as or within a secure message. When the message is received by the service provider 102, the service provider 102 may derive or extrapolate where the PTR 110 is geographically located, approximately, based on a geographical intersection of identified spot beam transports contained within the message.

The network 120 of the system 100 establishes a bi-directional communication path for data transfer between and among each respective element or component of the example system 100. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The PTR 110, and the STRs 112a-b, as described throughout may generally be any type of television receiver, such as a STB (Set-Top-Box) for example. In another example, the PTR 110, and the STRs 112a-b, may exhibit functionality integrated as part of or into a television, a DVR, a computer such as a tablet computing device, or any other computing system or device, as well as variations thereof. Further, the PTR 110 and the network 120, together with the STRs 112a-b and televisions 114a-c, and possibly one or more of the computing devices 116a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 100 may be configured to communicate in accordance with the MoCA® (Multimedia over Coax Alliance) home entertainment networking standard. Still other examples are possible.

In practice, the satellites 106a-c may each be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation-specific scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. In this example, the HD channel may be output to the television 114c in accordance with the HDMI/HDCP content protection technologies. Other examples are possible.

Further, the PTR 110 may select via tuner, decode, and relay particular transponder streams to one or both of the STRs 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of STR 112a in accordance with a particular content protection technology and/or networking standard. Still further, the satellite dish 108 and the PTR 110 may, respectively, be configured to receive, decode, and relay at least one premium television channel to one or both of the computing devices 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
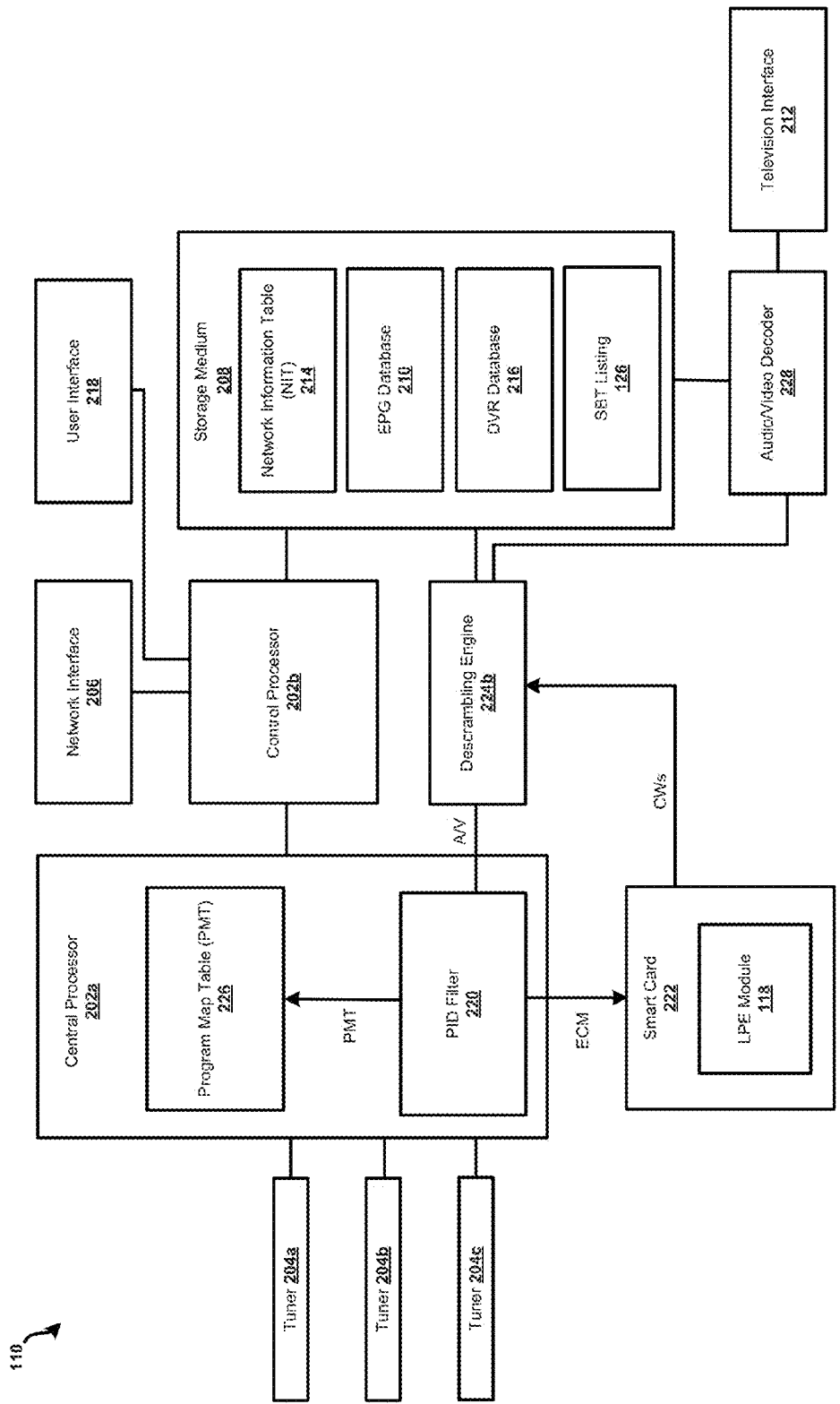
FIG. 2 shows a block diagram of a television receiver of FIG. 1.

Referring now to FIG. 2, an example block diagram of the PTR 110 of FIG. 1 is shown in accordance with the present disclosure. In some examples, at least one of the STRs 112a-b may be configured in a manner similar to that of the PTR 110. In other examples, at least one of the STRs 112a-b may be configured to exhibit reduced functionality as compared to the PTR 110, and may depend at least to a certain degree on the PTR 110 to implement certain features or functionality. In this example, the STRs 112a-b may be referred to as a "thin client."

For brevity, the PTR 110 is depicted in a simplified and conceptual form, and may generally include more or fewer elements or components as desired in accordance with the present disclosure. For example, the PTR 110 is shown in FIG. 2 to include the LPE module 118 as mentioned above in connection with FIG. 1. The PTR 110 is shown in FIG. 2 to further include a SBT (Spot Beam Transport) listing 126, discussed in further detail below. Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 110 may be configured to include any number of other various components or logical modules that are implemented in hardware, software, firmware, or any combination thereof, and such components or logical modules may or may not be implementation-specific.

Referring still to FIG. 2, the PTR 110 may include at least one processor 202, including a central processor 202a and a control processor 202b, a plurality of tuners 204a-c, at least one network interface 206, at least one non-transitory computer-readable storage medium 208, at least one EPG database 210, at least one television interface 212, at least one NIT (Networking Information Table) 214, at least one DVR database 216, at least one user interface 218, at least one PID filter 220, at least one smartcard 222, at least one descrambling engine 224, at least one PMT (Program Map Table) 226, and at least one decoder 228. In other examples of the PTR 110, fewer or greater numbers of components or modules may be present. Further, functionality of one or more components or modules may be combined; for example, functions of the descrambling engine 224 may be performed by the central processor 202a. Still further, functionality of components may be spread among additional components. For example, the PID filter 220 may be handled by hardware and/or software separate from the PMT 226.

The processor 202 may include one or more specialized and/or general-purpose processors configured to perform processes such as tuning to a particular channel, accessing and displaying EPG information from the EPG database 210, and/or receiving and processing input from a user. For example, processor 202 may include one or more processors dedicated to decoding video signals from a particular format, such as MPEG, for output and display on a television and for performing or at least facilitating descrambling.

The control processor 202b may communicate with the central processor 202a. The control processor 202b may control the recording of television channels based on timers stored in the DVR database 216. The control processor 202b may initiate recording of a television channel by sending a record command along with an indication of the television channel to be recorded to the central processor 202a. The control processor 202b may not send a second record command, when additional recording is to begin at the same time, until an acknowledgement that recording of the first television channel has successfully been received and initiated by the central processor 202a. The control processor 202b may also provide commands to the central processor 202a when recording of a television channel is to cease. In addition to providing commands relating to the recording of television channels, the control processor 202b may provide commands to the central processor 202a that indicate television channels to be output to the decoder 228 for output to a presentation or display device (e.g., television 114c).

The control processor 202b may also communicate with the network interface 206 and the user interface 218. The control processor 202b may handle incoming data from the network interface 206 and the user interface 218. Additionally, the control processor 202b may be configured to output data, such as a secure message for example, via the network interface 206, and graphical user interface, such as a system warning message for example, via the user interface 218, as described in further detail below. Other examples are possible. For example, such functionality may be wholly or at least partially implemented or controlled by the central processor 202a. Still other examples are possible.

The tuners 204a-c may be used to tune to television channels, such as television channels transmitted via satellite or cable, such as satellites 106a-c. Each respective one of the tuner 204a-c may be capable of receiving and processing a single stream of data from a satellite transponder, or a cable channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. Still another tuner (e.g., tuner 204c) may be used to check various television channels to determine if they are available or not. If multiple television channels transmitted on the same transponder stream are desired, a particular tuner (e.g., tuner 204*a*) may be used to receive the signal containing the multiple television channels for presentation and/or recording. The tuners 204*a-c* may receive commands from the central processor 202*a* and/or control processor 202*b*. Such commands may instruct the tuners 204*a-c* which frequencies are to be used for tuning.

The network interface 206 may be used to communicate via an alternate communication channel with the service provider 102. For example, the primary communication channel between the television service provider and the PTR 110 may be via satellites 106*a-c*, which may be unidirectional to the STB, and an another communication channel between the service provider 102 and the PTR 110, which may be bidirectional, via the network 120, such as the Internet and/or a phone line. In this example, data such as at least a secure message may be transmitted from the PTR 110 to the service provider 102, and from the service provider 102 to the PTR 110. The network interface 206 may be configured to communicate via one or more networks, such as the Internet, to communicate with the service provider 102. Information may be transmitted and/or received via the network interface 206.

The storage medium 208 may represent a non-transitory computer-readable storage medium. The storage medium 208 may include memory and/or a hard drive. The storage medium 208 may be used to store information received from one or more satellites and/or information received via the network interface 206. The storage medium 208 may store information related to the EPG database 210, the NIT 214, and/or the DVR database 216, among other elements or features, such as the SBT listing 126. In general, the SBT listing 126 may include a list of spot beam transports that the PTR 110 has access to or can "see" or "detect," as discussed further below. Recorded television programs may be stored using the storage medium 208. The storage medium 208 may be partitioned or otherwise divided such that predefined amounts of the storage medium 208 are devoted to storage of omnibus channel files and user-selected television programs.

The EPG database 210 may store information related to television channels and the timing of programs appearing on such television channels. The EPG database 210 may be stored using the storage medium 208, which may be a hard drive. Information from the EPG database 210 may be used to inform users of what television channels or programs are popular and/or provide recommendations to the user. Information from the EPG database 210 may provide the user with a visual interface displayed by a television that allows a user to browse and select television channels and/or television programs for viewing and/or recording. Information used to populate the EPG database 210 may be received via the network interface 206 and/or via satellites, such as satellites 106*a-c* of FIG. 1 via the tuners 204*a-c*. For instance, updates to the EPG database 210 may be received periodically via satellite. The EPG database 210 may serve as an interface for a user to control DVR functions of the PTR 110, and/or to enable viewing and/or recording of multiple television channels simultaneously.

In addition to being used to provide users with information about scheduled programming, information from the EPG database 210 may be used to determine when television programs begin and end for the purposes of recording. For instance, when a channel-specific file is recorded that contains multiple television channels, the start and end of time of specific television programs within the channel-specific file may be based on the start and end times indicated in the EPG database 210. Other data may be stored within the EPG database 210 that may be useful in managing channel-specific files, such as series identifiers and episode identifiers, which may be used by a television service provider to identify particular television programs.

The decoder 228 may serve to convert encoded video and audio into a format suitable for output to a display device. For instance, the decoder 228 may receive MPEG video and audio from the storage medium 208, or the descrambling engine 224, to be output to a television. MPEG video and audio from the storage medium 208 may have been recorded to the DVR database 216 as part of a previously-recorded television program. The decoder 228 may convert the MPEG video and audio into a format appropriate to be displayed by a television or other form of display device and audio into a format appropriate to be output from speakers, respectively.

The television interface 212 may serve to output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The NIT 214 may store information used by the PTR 110 to access various television channels. The NIT 214 may be stored using the storage medium 208. Information used to populate the NIT 214 may be received via satellite, or cable, via the tuners 204*a-c* and/or may be received via the network interface 206 from a service provider. As such, information present in the NIT 214 may be periodically updated. The NIT 214 may be locally-stored by the PTR 110 using the storage medium 208. Information that may be present in the NIT 214 may include, for example: television channel numbers, a satellite identifier, a frequency identifier, a transponder identifier, an ECM (Entitlement Control Message), a PID (Packet Identifier), one or more audio PIDs, and a video PID. A second audio PID of a channel may correspond to a SAP (Second Audio Program) program, such as in another language. In some examples, the NIT 214 may be divided into additional tables. For example, rather than the specific audio PIDs and video PIDs being present in the NIT 214, a channel identifier may be present within NIT 214 which may be used to look up the audio PIDs and video PIDs in another table, such as the PMT 226. For example, the PMT 226 may store information on audio PIDs and video PIDs for television channels that are transmitted on a transponder frequency.

Table 1 below provides a simplified example of the NIT 214 for several television channels. It should be understood that in other examples, many more television channels may be represented in the NIT 214. The NIT 214 may be at least periodically updated by a television service provider. As such, television channels may be reassigned to different satellites and/or transponders, and the PTR 110 may be able to handle this reassignment as long as the NIT 214 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 602 |
| 7 | 2 | 3 | 31 | 1001 |
| 13 | 2 | 4 | 33 | 604 |

Based on information in the NIT 214, it may be possible to determine the proper satellite and transponder to which to tune for a particular television channel. In some examples, the NIT 214 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder. The values provided in Table 1 are for example purposes only. Actual values, including how satellites and transponders are identified, may vary. Additional information may also be stored in NIT 214. The same PID may be reused on different transponders.

A DVR may permit a television channel to be recorded for a period of time. DVR functionality of the PTR 110 may be managed by the control processor 202b. The control processor 202b may coordinate the television channel, start time, and stop time of when recording of a television channel is to occur. The DVR database 216 may store information related to the recording of television stations. The DVR database 216 may store timers that are used by the control processor 202b to determine when a television channel should be tuned to and its programs recorded to the DVR database 216. However, other examples are possible. For example, in some examples, the storage medium 208 may store timers. Timer files may be defined as a daily schedule db.dat file and a gloal timer db.dat file. In general, when a "new" timer is created, a "new" entry may be added into the daily schedule db.dat and gloal timer db.dat files, which may include all timer related information such as channel number, start time, duration, etc. Further, a limited amount of the storage medium 208 may be devoted to the DVR database 216. Timers may be set by a service provider and/or one or more users of the PTR 110.

DVR functionality of the control processor 202b may have multiple modes. For example, DVR functionality of the control processor 202b may be configured to record individual television programs selected by a user to the DVR database 216. Using the EPG database 210, a user may select a particular television program. Based on the date, time period, and television channel indicated by the EPG database 210, the control processor 202b may record the associated television program to the DVR database 216. In another example, the DVR database 216 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 102).

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the control processor 202b.

Referring back to tuners 204a-c, television channels received via satellite, or cable, may contain at least some scrambled data. Packets of audio and video may be scrambled to prevent unauthorized users, such as nonsubscribers, from receiving television programming without paying the television service provider. When one of the tuners 204a-c is receiving data from a particular transponder of a satellite, the transponder stream may be a series of data packets corresponding to multiple television channels. Each data packet may contain a PID, which, in combination with the NIT 214 and/or the PMT 226, can be determined to be associated with particular television channel. Particular data packets, referred to as ECMs may be periodically transmitted. ECMs may be associated with another PID and may be scrambled; the PTR 110 may use the smartcard 222 to descramble ECMs. Descrambling of an ECM may only be possible when the user (e.g., PTR 110) has authorization to access the particular television channel associated with the ECM. When an ECM is determined to correspond to a television channel being stored and/or displayed, the ECM may be provided to the smartcard 222 for descrambling.

When the smartcard 222 receives a scrambled ECM, the smartcard 222 may descramble the ECM to obtain some number of control words. In some examples, from each ECM received by the smartcard 222, two control words are obtained. In some examples, when the smartcard 222 receives an ECM, it compares the ECM to the previously received ECM. When the two ECMs match, the second ECM is not descrambled because the same control words would be obtained. In other examples, each ECM received by the smartcard 222 is descrambled; however, when a second ECM matches a first ECM, the outputted control words will match; thus, effectively, the second ECM does not affect the control words output by the smartcard 222. The smartcard 222 may be permanently part of the PTR 110 or may be configured to be inserted and removed from PTR 110.

The central processor 202a may be in communication with the tuners 204a-c and the control processor 202b. The central processor 202a may be configured to receive commands from the control processor 202b. Such commands may indicate when to start/stop recording a television channel and/or when to start/stop causing a television channel to be output to a television. The central processor 202a may control the tuners 204a-c. The central processor 202a may provide commands to the tuners 204a-c that instruct the tuners which satellite, transponder, and/or frequency to tune to. From the tuners 204a-c, the central processor 202a may receive transponder streams of packetized data. As previously detailed, some or all of these packets may include a PID that identifies the content of the packet.

The central processor 202a may be configured to create at least one PID filter 220 that sorts packets received from the tuners 204a-c based on the PIDs. When a tuner is initially tuned to a particular frequency, such as a particular transponder of a satellite, a PID filter may be created based on a PID of PMT data. The PID of PMT data packets may be known because it is stored as part of the NIT 214. From the PMT data packets, the PMT 226 may be constructed by central processor 202a.

Table 2 below provides an example extract of a PMT. The PMT 226 may be specific to a particular transponder. As such, when tuning to a different transponder occurs, a new PMT may be created for the different transponder. Accordingly, based on the information present in the PMT 226, the audio and video PIDs for specific television channels may be identified. A television channel may have multiple audio PIDs due to a second audio program, which may be in a different language.

TABLE 2

| Channel | Video PID | 1st Audio PID | 2nd Audio PID |
|---------|-----------|---------------|---------------|
| 4 | 1003 | 2383 | 2119 |
| 5 | 2993 | 2727 | 2728 |
| 7 | 9238 | 1233 | 0129 |
| 13 | 0012 | 9348 | — |

The values provided in Table 2 are for example purposes only. Actual values may vary. Additional information or less information may also be stored in the PMT 226.

The PID filter 220 may be configured to filter data packets based on PIDs. In some examples, the PID filter 220 is created and executed by central processor 202*a*. In other examples, separate hardware may be used to create and execute multiple PID filters. Depending on a television channel selected for recording/viewing, a PID filter may be created to filter the video and audio packets associated with the television channel, based on the PID assignments present in the PMT 226. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 224 or the smartcard 222; other data packets may be ignored. For each television channel, a stream of video packets, a stream of audio packets, one or both of the audio programs, and/or a stream of ECM packets may be present, each stream identified by a PID. In some examples, a common ECM stream may be used for multiple television channels. Additional data packets corresponding to other information, such as updates to the NIT 214, may be appropriately routed by the PID filter 220. At a given time, one or multiple PID filters may be executed by the central processor 202*a*.

The descrambling engine 224 may use the control words output by the smartcard 222 in order to descramble video and/or audio corresponding to television channels for storage and/or presentation. Video and/or audio data contained in the transponder data stream received by the tuners 204*a-c* may be scrambled. Video and/or audio data may be descrambled by descrambling engine 224 using a particular control word. Which control word output by the smartcard 222 to be used for successful descrambling may be indicated by a scramble control identifier present within the data packet containing the scrambled video or audio. Descrambled video and/or audio may be output by the descrambling engine 224 to the storage medium 208 for storage in the DVR database 216 and/or to the decoder 228 for output to a television or other presentation equipment via the television interface 212.

For simplicity, the PTR 110 of FIG. 2 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 3:
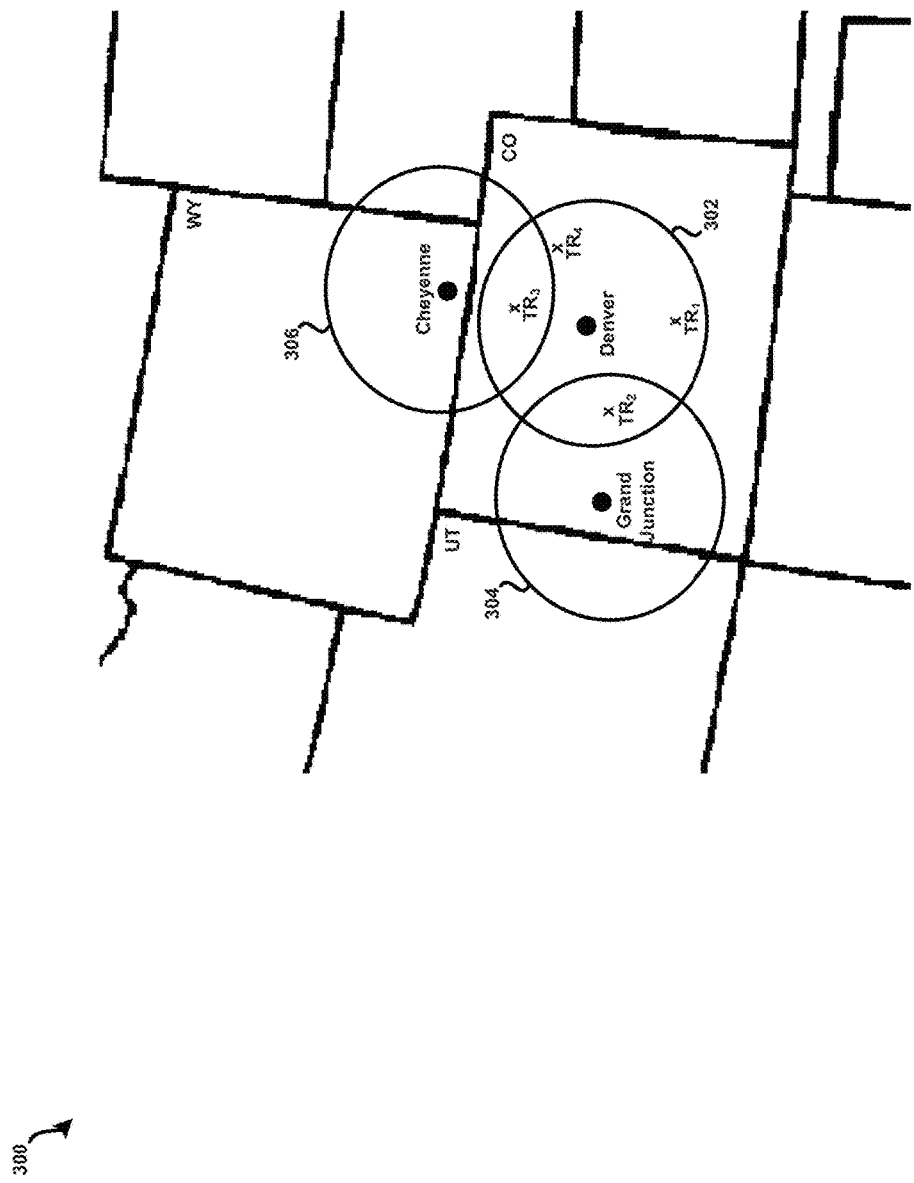
FIG. 3 shows an example representation of areal spot beam coverage.

Referring now to FIG. 3, an example representation 300 of areal satellite spot beam coverage is shown in accordance with the present disclosure. In general, a spot beam may refer to a satellite broadcast signal that is directed or projected towards and covers a specific region or area of the Earth's surface. For example, FIG. 3 illustrates a first spot beam 302 approximately centered on the city of Denver, Colo., a second spot beam 304 approximately centered on the city of Grand Junction, Colo., and a third spot beam 306 approximately centered on the city of Cheyenne, Wyo. It will be appreciated though that the example representation 300 is idealized for discussion purposes. For example, none of the respective spot beams 302, 304, 306 need neccesarily be centered on any particular city. Further, relative size of the respective spot beams 302, 304, 306 measured for example as projected on the Earth's surface (e.g, coverage approximated by the radius of a circle) may vary as desired. For example, the first spot beam 302 may have an areal coverage of about 100 square miles, whereas the second spot beam 304 may have an areal coverage of about 50 square miles, and etc. Still further, relative shape of the respective spot beams 302, 304, 306 may be about or approximately circular as shown in FIG. 3, but may not be defined by a sharp or drastic coverage cut-off, and instead may exhibit a gradual coverage cut-off, as discussed further below.

Each of the respective spot beams 302, 304, 306 may have a particular signal transmission frequency band. For example, the first spot beam 302 may have a transmission frequency band $F_1$, the second spot beam 304 may have a transmission frequency band $F_2$, and the third spot beam 306 may have a transmission frequency band $F_3$. The frequency bands $F_{1-3}$ may be separated in spectrum such the none of the respective frequency bands $F_{1-3}$ interfere with each other. In general, the frequency bands $F_{1-3}$ may be licensed to the service provider 102 of FIG. 1 for the purpose of providing broadcast programming to customers at or at least near regions on the Earth's surface associated with the respective spot beams 302, 304, 306. One benefit in using spot beams to deliver or provide broadcast programming, as opposed to using beams that cover a much greater geographical area, such as the contintental United States (CONUS), is that a spot beam may allow the service provider 102 to deliver more local channels to specific, precisely defined areas since an allocated frequency band may be reused across different geographically separated areas. For example, the frequency band $F_1$ used to provide broadcast programming to customers at or near Denver, Colo. may also be used to provide broadcast programming to customers at or near Boston, Mass., for example. In this manner, the service provider 102 is essentially enabled to provide more content per licensed bandwidth than that might be achieved using CONUS broadcast technology.

Referring still to FIG. 3, a specific, exactly precise geographic location, indicated by marker "x" in FIG. 3, of a number of different television receivers are shown for example purposes. In general, it may be observed that each of the respective receivers is geographically located within coverage provided by at least one of the spot beams 302, 304, 306. For example, the receiver $TR_1$ is geographically located or positioned within coverage provided by the first spot beam 302, the receiver $TR_2$ is geographically located or positioned within coverage provided by the first spot beam 302 and the second spot beam 304, the receiver $TR_3$ is geographically located or positioned within coverage provided by the first spot beam 302 and the third spot beam 306, and the receiver $TR_4$ is geographically located or positioned within coverage provided by the first spot beam 302. Other examples are possible.

In one example, each of the respective receivers $TR_{1-4}$ may be configured so as to only be able to decode programming provided by the first spot beam 302. For example, at least the service provider 102 may dictate that each of the receivers $TR_{1-4}$ is approved to decode and output for display by a particular presentation or display device (e.g., television 114c) programming provided by the first spot beam 302, because the receivers $TR_{1-4}$ are each geographically located within a television market associated with Denver, Colo. In general, the receivers $TR_{1-4}$ may be programmed as part of an installation process, for example, to detect and output for display programming provided by the first spot beam 302. However, even though each of the receivers $TR_{1-4}$ is only approved to output for display programming provided by the first spot beam 302, some of the receivers $TR_{1-4}$ may still be able to detect at least one of the other respective spot beams 304, 306. Table 3 below provides a summary of various parameters, some similar to those discussed in this paragraph, that may be associated with respective ones of the receivers $TR_{1-4}$.

TABLE 3

| Television Receiver | Account ID | Approved Transponder ID and Signal Strength | Detected Transponder ID and Signal Strength |
|---|---|---|---|
| $TR_1$ | 1 | X: $SS_1$ | X: $SS_1$ |
| $TR_2$ | 2 | X: $SS_2$ | X: $SS_2$/Y: $SS_2$ |
| $TR_3$ | 3 | X: $SS_3$ | X: $SS_3$/Z: $SS_3$ |
| $TR_4$ | 4 | X: $SS_4$ | X: $SS_4$/Z: $SS_4$ |

The first column of Table 3 identifies a particular one of the receivers $TR_{1-4}$ of FIG. 3. The second column of Table 3 includes a unique account identifier associated with each particular one of the receivers $TR_{1-4}$. Although the unique account identifier is shown as a numeric digit, it will be appreciated that the unique account identifier may take the form of any particular identifier as desired such as, for example, a string of ten or so digits that correspond or may be mapped to a particular customer account number. In this manner, each one of the receivers $TR_{1-4}$ may be associated or correlated to or with a particular customer account.

The third column of Table 3 includes a transponder identifier that uniquely identifies the first spot beam 302 (and a particular transponder of a particular satellite that broadcasts the first spot beam 302) as in the present example the service provider 102 has dictated that each of the receivers $TR_{1-4}$ is approved to output for display programming provided only by the first spot beam 302. In this example, the unique transponder identifier that identifies the first spot beam 302 is for simplicity defined as "X," although other examples are possible. The third column of Table 3 also includes an entry "$SS_1$" that is associated with the receiver $TR_1$, an entry "$SS_2$" that is associated with the receiver $TR_2$, an entry "$SS_3$" that is associated with the receiver $TR_3$, and an entry "$SS_4$" that is associated with the receiver $TR_4$. Each of the respective entries $SS_{1-4}$ may represent a signal strength parameter that, in arbitrary units, quantifies strength of the signal of the first spot beam 302 as detected by each one of the receivers $TR_{1-4}$ at their particular or respective geographic location within the coverage area of the first spot beam 302.

The fourth column of Table 3, in some instances in addition to "X," includes a transponder identifier that uniquely identifies the second spot beam 304 as "Y," or a transponder identifier that uniquely identifies the third spot beam 306 as "Z." Specifically, with reference to the receiver $TR_2$, the fourth column of Table 3 includes an entry "X:$SS_2$/Y:$SS_2$," meaning that the receiver $TR_2$ is able to detect both the first spot beam 302 having a particular signal strength and the second spot beam 304 having a particular signal strength. This is because, as shown in FIG. 3, the receiver $TR_2$ is geographically located within an intersection of the first spot beam 302 and the second spot beam 304. Here, even if the specific, exactly precise geographic location of the receiver $TR_2$ is not known, it will be appreciated that the geographic location of the receiver $TR_2$ may be approximated based on the information contained within the fourth column of Table 3. Specifically, if it is determined by some mechanism, such as the receiver $TR_2$ reporting to the service provider 102, that the receiver $TR_2$ can detect both the first spot beam 302 and the second spot beam 304, the service provider 102 may extrapolate or derive an approximate geographical location of the receiver $TR_2$ as being at least somewhere within the intersection or overlap of the first spot beam 302 and the second spot beam 304.

Similarly, with reference to the receiver $TR_3$, the fourth column of Table 3 includes an entry "X:$SS_3$/Z:$SS_3$," meaning that the receiver $TR_3$ is able to detect both the first spot beam 302 having a particular signal strength and the third spot beam 306 having a particular signal strength. This is because in the present example, and as shown in FIG. 3, the receiver $TR_3$ is geographically located within an intersection of the first spot beam 302 and the third spot beam 306. Here, even if the specific, exactly precise geographic location of the receiver $TR_3$ is not known, it will be appreciated that the geographic location of the receiver $TR_3$ may be approximated based on the information contained within the fourth column of Table 3. Specifically, if it is determined by some mechanism, such as the receiver $TR_3$ reporting to the service provider 102, that the receiver $TR_3$ can detect both the first spot beam 302 and the third spot beam 306, the service provider 102 may extrapolate or derive an approximate geographical location of the receiver $TR_3$ as being at least somewhere within the intersection or overlap of the first spot beam 302 and the third spot beam 306.

Similarly, with reference to the receiver $TR_4$, the fourth column of Table 3 includes an entry "X:$SS_4$/Z:$SS_4$," meaning that the receiver $TR_4$ is able to detect both the first spot beam 302 and the third spot beam 306. This is because in the present example, and as shown in FIG. 3, the receiver $TR_4$ is geographically located within coverage provided by the first spot beam 302, and is also relatively near or close to coverage provided by the third spot beam 306. As mentioned above, relative shape of the respective spot beams 302, 304, 306 may be about or approximately circular, but may not be defined by a sharp coverage cut-off, and instead may be defined by a gradual coverage cut-off Here, even if the specific, exactly precise geographic location of the receiver $TR_4$ is not known, it will be appreciated that the geographic location of the receiver $TR_4$ may be approximated based on the information contained within the fourth column of Table 3. Specifically, if it is determined by some mechanism, such as the receiver $TR_4$ reporting to the service provider 102, that the receiver $TR_4$ can detect the first spot beam 302 and the third spot beam 306, the service provider 102 may extrapolate or derive an approximate geographical location of the receiver $TR_4$ as being at least somewhere near the arc of the third spot beam 306 that is located geographically near or within the first spot beam 304. Here, it is contemplated that detected signal strength of the third spot beam 306 may also be reported back to the service provider 102 so that a more precise location profiling may be implemented. For example, strength of the third spot beam 306 may fall-off as power law near the periphery of the coverage provided by the third spot beam 306, and thus it will be appreciated that a more precise approximation of the location of the receiver $TR_4$ may be achieved with this type of information.

Figure 4:
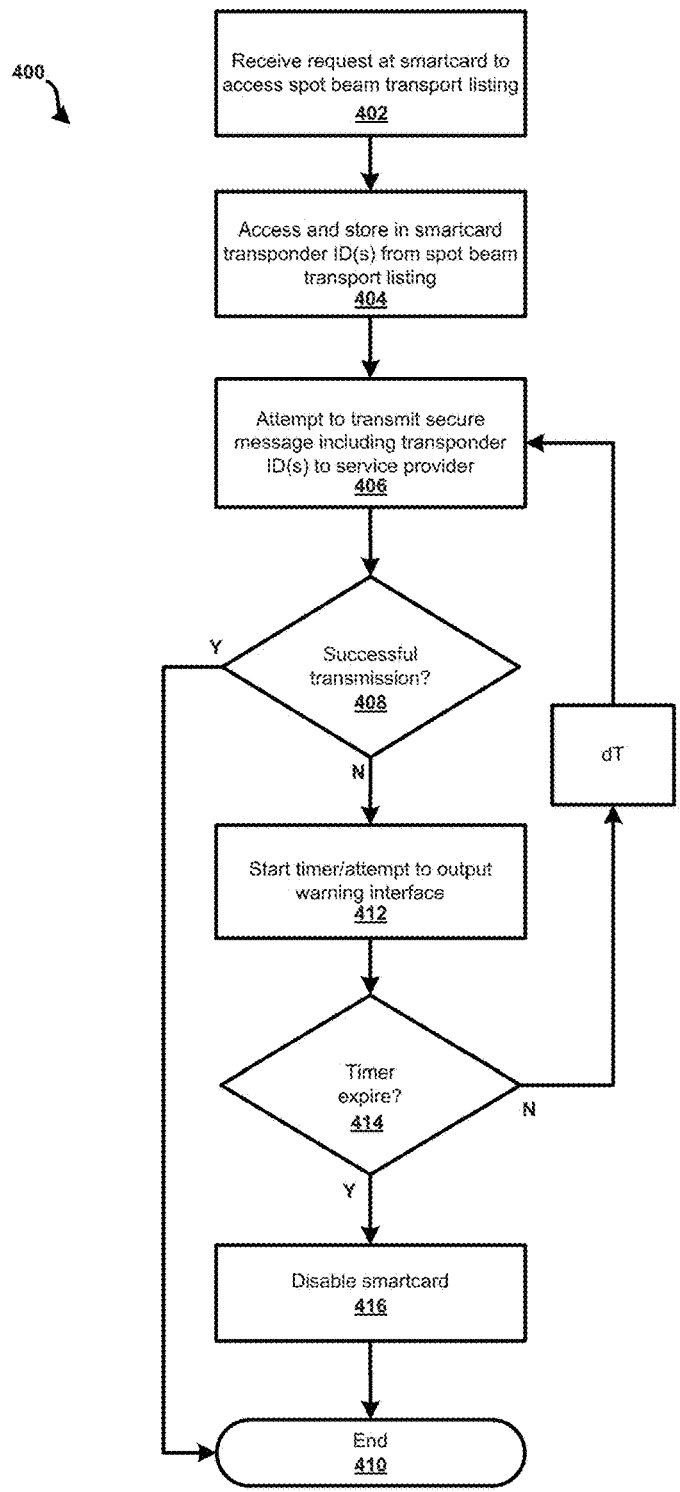
FIG. 4 shows an example method in accordance with the disclosure.

Referring now to FIG. 4, and additionally with reference to FIGS. 1-2, an example method 400 is shown in accordance with the present disclosure. In general, steps or modules of the method 400 as described may ultimately be implemented by at least one of the LPE module 118 of the PTR 110 of FIG. 1, and/or PTR 110 itself. Other examples are however possible. For instance, one or more steps or modules of the method 400 may be implemented wholly or at least partially by or on one or more of the other respective devices or components of the example system 100 as described above in connection with FIG. 1.

At step 402, the LPE module 118 of the smartcard 222 may receive a scrambled message sent from the service provider 102 over one of the satellites 106*a-c* to access the SBT listing 126 that is stored on the storage medium 208. As mentioned above, the SBT listing 126 may include a list of spot beam transports that the PTR 110 has access to or can see or detect. In one example, the scrambled message may be embodied as a particular ECM that may be routed to the smartcard 222 in a manner similar to other types of ECM messages as discussed above. Other examples are possible. For instance, the scrambled message may be incorporated within a particular communication sequence between the PTR 110 and the service provider 102 over the network 120. In this manner, the scrambled message may be sent to the PTR 110 from the service provider 102 over one or more of a satellite communication link and a terrestrial communication link.

At step 404, the LPE module 118 may, in response to receiving the scrambled message at step 402, query the SBT listing 126 and retrieve and store the list of spot beam transports that the PTR 110 has access to or can see or detect. For example, assuming that the PTR 110 corresponds to the receiver $TR_2$ discussed above in connection with FIG. 3, the LPE module 118 may retrieve and store the information "X:$SS_2$/Y:$SS_2$" to the smartcard 222. In general, the information X:$SS_2$/Y:$SS_2$ stored to the smartcard 222 may, for example, be stored in an encrypted form so that it may be difficult if not impossible for a third party to access and determine precisely what the encrypted version of the information X:$SS_2$/Y:$SS_2$ corresponds to. Other examples are possible At step 406, and continuing with the present example, the LPE module 118 may instantiate a process to transmit a secure message to the service provider 102 that includes at least the information X:$SS_2$/Y:$SS_2$. For example, the smartcard 122 may provide an instruction to the control processor 202*b* to generate a scrambled message that includes an encrypted version of the information X:$SS_2$/Y:$SS_2$ as well "Account ID 2" so that information within the secure message may ultimately be mapped back to the PTR 110 by the service provider 102. The control processor 202*b* may then activate the network interface 206 so that the secure message may be sent to the service provider 102 over the network 120. In many instances, however, the PTR 110 may not be connected to the network 120. For example, if the PTR 110 is being used for illegitimate purposes, the PTR 110 may be intentionally not connected to the network 120. In another example, the PTR 110 may be used for legitimate purposes by a particular customer but that customer may not have access to the network 120. For example, the customer may not have Internet or landline phone services. Other examples are possible.

At step 408, the LPE module 118 may determine whether or not the secure message was successfully transmitted to the service provider 102 over the network 120. It is contemplated that the determination may be enabled in any number of ways. For example, the LPE module 118 may detect via the network interface 206 a confirmation message from the service provider 102 that the secure message was received by the service provider 102. In another example, the LPE module 118 may detect via ECM message sent over one of the satellites 106*a-c* by the service provider 102 a confirmation message from the service provider 102 that the secure message was received. In this manner, the confirmation message may be sent to the PTR 110 from the service provider 102 over one or more of a satellite communication link and a terrestrial communication link. When it is determined that the secure message was successfully transmitted to the service provider 102 over the network 120, process flow within the example method 400 may branch to step 410, which corresponds to termination of the method 400. When it is determined that the secure message was not successfully transmitted to the service provider 102 over the network 120, process flow within the example method 400 may branch to step 412.

At step 412, the LPE module 118 may start a timer, and further attempt to output for display by the television 114*c*, for example, a warning interface so that a customer may be notified that it has been detected that the PTR 110 does not have access to the network 120, and that the customer should contact an account representative of the service provider 102 in order to ensure that no service disruption would potentially occur. In many cases, if the PTR 110 is being used for illegitimate purposes, the PTR 110 may not be connected to any particular presentation or display device and thus it is contemplated that the warning interface may not necessarily ever be viewed by a particular individual. If the PTR 110 is being used for legitimate purposes, however, the PTR 110 may very likely be connected to a particular presentation or display device, and thus it is contemplated that the warning interface is likely to viewed by a particular individual who would then contact an account representative of the service provider 102 in order to ensure that no service disruption would potentially occur. Other examples are possible.

At step 414, the LPE module 118 may determine whether or not the timer has reached a particular time value or "timed-out." The particular time value may be reached for example if the timer is started at step 412 at t=0 and then counts "upwards" to a finite non-zero value t=$t_1$. In another example, the particular time value may be reached if the timer is started at step 412 at a finite non-zero value t=$t_2$ and then counts "backwards" to t=0. Other examples are possible. When it is determined that the timer has not reached the particular time value, process flow within the example method 400 may branch back to step 410, after a predetermined time period or delay dT, so that the LPE module 118 may again instantiate a process to transmit the secure message to the service provider 102 that includes at least the information X:$SS_2$/Y:$SS_2$. It is contemplated that the predetermined time period or delay dT is configurable and may be defined as desired. For example, the predetermined time period or delay dT may be defined or otherwise programmed to be on the order of seconds, minutes, hours, days, weeks, and etc., and also may or may not be implementation-specific. Still other examples are possible.

When it is determined that the timer has reached the particular time value, process flow within the example method 400 may branch to step 416. Similar to the predetermined time period or delay dT, it is contemplated that the particular time value may be configurable and may be defined as desired. For example, the particular time value may be defined or otherwise programmed to be on the order of seconds, minutes, hours, days, weeks, and etc., and also may or may not be implementation-specific. At step 416, the LPE module 118 may disable the smartcard 222 so that the smartcard 222 no longer is able to perform its part in enabling the PTR 110 to output for presentation by a display device broadcast programming received by any particular spot beam that is detected by the PTR 110. Process flow within the example method 400 may then proceed to step 410 which corresponds to termination of the method 400. Such an implementation may prevent the PTR 110 from possibly being used for illegitimate purposes. If the PTR 110 is though being used for legitimate purposes, it may be very likely that a customer may contact an account representative of the service provider 102 to rectify the issue since the customer would no longer be able to watch satellite broadcast programming using the PTR 110.

Figure 5:
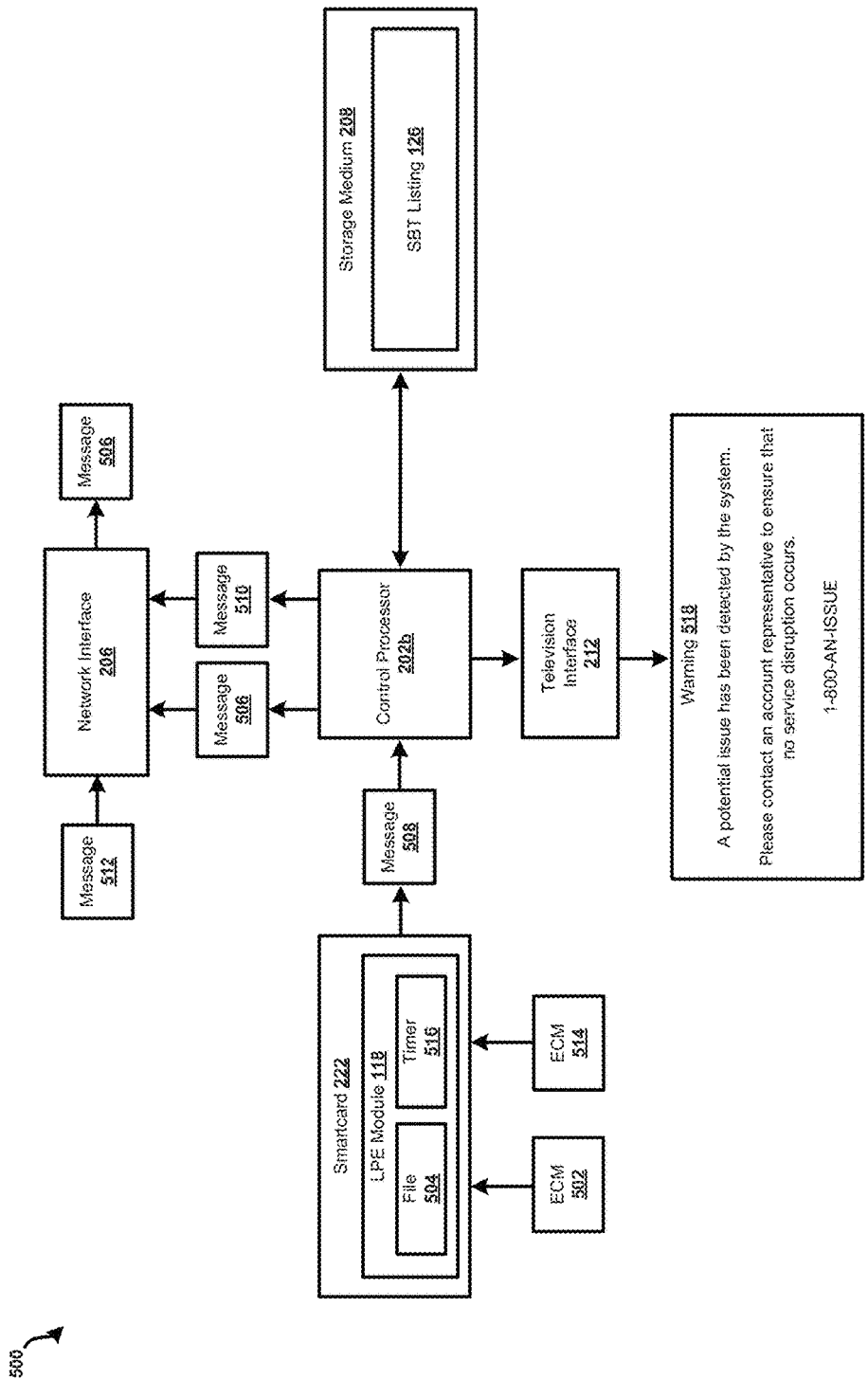
FIG. 5 shows an example communication sequence in accordance with the disclosure.

Referring now to FIG. 5, an example communication sequence 500 is shown in accordance with the present disclosure. In particular, the communication sequence 500 shows example messaging between one or more components of the PTR 110 as described above in connection with at least FIG. 2. In this example, the LPE module 118 of the smartcard 222 may initially receive at least one ECM 502 sent from the service provider 102 over one of the satellites 106a-c that includes an instruction or command for the smartcard 222 to access the SBT listing 126 that is stored on the storage medium 208. The SBT listing 126 may include a list of spot beam transports that the PTR 110 has access to or can see or detect. The LPE module 118 may, in response to receiving the ECM 502, query the SBT listing 126 and retrieve and store the list of spot beam transports that the PTR 110 has access to or can see or detect as a file 504. The file 504 may for example, and assuming for discussion purposes that the PTR 110 corresponds to the receiver TR$_2$ as discussed above in connection with at least FIG. 4, include the information "Account ID 2" and "X:SS$_2$/Y:SS$_2$," and possibly other information as well.

The LPE module 118 may then instantiate a process to transmit a secure message 506 to the service provider 102, where the secure message 506 at least includes information contained within the file 504. For example, the smartcard 122 may provide an instruction message 508 to the control processor 202b to generate the secure message 506 to include the information Account ID 2 and X:SS$_2$/Y:SS$_2$, as possibly encrypted and contained within the file 504. The control processor 202b may then activate the network interface 206 with a control message 510 so that the secure message 506 may be sent to the service provider 102 over one or more terrestrial networks, such as the network 120.

It is contemplated that the LPE module 118 may determine whether or not the secure message 506 was successfully transmitted to the service provider 102. For example, the LPE module 118 may detect via the network interface 206 a confirmation message 512 sent from the service provider 102 that indicates that the secure message 506 was received by the service provider 102. In another example, the LPE module 118 may detect via at least one other ECM 514 sent from the service provider 102 over one of the satellites 106a-c, where the ECM 514 may include a confirmation that the secure message 506 was received by the service provider 102. In instances where it is determined that the secure message 506 was not successfully transmitted to the service provider 102, the LPE module 118 may start or otherwise activate a timer 516, and further attempt to output for presentation by a display device, via the television interface 212, a warning 518 so that a customer may be notified that it has been detected that the PTR 110 does not have access to any particular terrestrial network. The warning 518 may further include a notification that the customer should contact an account representative of the service provider 102 in order to ensure that no service disruption would potentially occur.

For example, the warning 518 may include the narrative or statement "A potential issue has been detected by the system. Please contact an account representative to ensure that no service disruption occurs. 1-800-AN-ISSUE." In many cases, if the PTR 110 is being used for illegitimate purposes, the PTR 110 may not be connected to any particular display device, and thus it is contemplated that the warning 518 may not necessarily ever be viewed by a particular individual. If the PTR 110 is being used for legitimate purposes, however, the PTR 110 may very likely be connected to a particular display device, and thus it is contemplated that the warning 518 is likely to viewed by a particular individual, who would then likely contact an account representative of the service provider 102 in order to ensure that no service disruption would potentially occur.

In the scenario where it is determined that the secure message 506 was not successfully transmitted to the service provider 102, the LPE module 118 may be configured to determine at a subsequent point in time whether or not the timer 516 has reached a particular time value. When it is determined that the timer 516 has not reached the particular time value, the LPE module 118 may, following a predetermined time period or delay dT, again instantiate a process to transmit the secure message 506 to the service provider 102. In this manner, the PTR 110 may periodically or at least intermittently attempt to report the secure message 506 to the service provider 102. When it is determined however that the timer 516 has reached the particular time value, the LPE module 118 may disable the smartcard 222 so that the smartcard 222 no longer is able to perform its part in enabling the PTR 110 to output for presentation by a display device satellite broadcast programming.

The present disclosure is directed to one or more of a system, method, apparatus, and computer-program product to identify or approximate or estimate where a particular television receiver is geographically located using spot beam transport information as described in the specification and/or shown in any of the drawings. For instance, in one example implementation, a method may include or comprise receiving at a television receiver a command to access a listing that contains at least one transponder identifier that identifies a particular signal detected by the television receiver, and querying, based on the command, a memory location of the television receiver that is associated with the listing, to obtain each transponder identifier within the listing. In general, it is contemplated that the listing may comprise of any particular data structure, type of which may be implementation-specific, possibly dependent on type of the memory location. For example, it is contemplated that the listing could be a look-up table stored in a database or flash memory of the television receiver. Other examples are possible.

It is further contemplated that the listing, and thus data contained therein, may be encrypted so as to not be easily readable by anyone unauthorized to access data stored or contained within the listing. It is still further contemplated that the command itself may be received by the television receiver over any particular communication channel, such as via a terrestrial communication link (e.g., via Internet, telephone) and/or via a non-terrestrial communication link (e.g., via satellite) within an entitlement control message or ECM, or possibly generated by the television receiver itself in response to expiration of a particular timer or other timekeeping mechanism as maintained, managed, and/or implemented by the television receiver itself. Other examples are possible.

The method may further include or comprise queuing a message that includes a representation of each transponder identifier within the listing for transmission over a network interface of the television receiver to a computing system that is configured to estimate geographic location of the television receiver based on each transponder identifier within the listing. The method may further include or comprise transmitting the message over the network interface of the television receiver to the computing system that is configured to estimate geographic location of the television receiver based on each transponder identifier within the listing. The method may further include or comprise receiving by the television receiver from the computing system confirmation of receipt of the message by the computing system.

Here, it is contemplated that the message itself may be embedded within an encrypted data stream, that which might include other information normally or typically reported back to the computing system, such as versioning information that identifies type and/or model of the television receiver and/or one or more components of the television receiver (e.g., smartcard), video-on-demand information that might be reported back to the computing system for billing purposes, and etc. In this manner, the message may be securely and privately transmitted, and then may be used or utilized by an entity associated with the computing system to derive or estimate physical or geographic location of the television receiver. Other examples are possible.

For instance, the method may further include or comprise receiving by the television receiver an indication of unsuccessful transmission of the message to the computing system. The method may further include or comprise retransmitting the message over the network interface in response to passage of a predetermined time period following receiving the indication of unsuccessful transmission of the message to the computing system. The method may further include or comprise generating by the television receiver a warning message for transmission over a television interface of the television receiver to a television that is configured to output for display the warning message to prevent unintended service disruption. The method may further include or comprise disabling by the television receiver a smartcard of the television receiver following passage of a predetermined time period to disrupt service. In general, the smartcard may be considered an access restricted processor that when disabled may prevent or preclude the television receiver from outputting any television programming to any display device, Here, it is contemplated that when the television receiver is unable to, after a number of attempts, access a communication link to report the message to the computing system, steps may be taken remedy the situation via user prompt or other mechanism. Additionally, in instances when the television receiver is unable to, after a number of attempts, access a communication link to report the message to the computing system, steps may be taken to disable the television receiver, in order to ensure that satellite-sourced programming is not accessed without permissions or authorizations.

Figure 6:
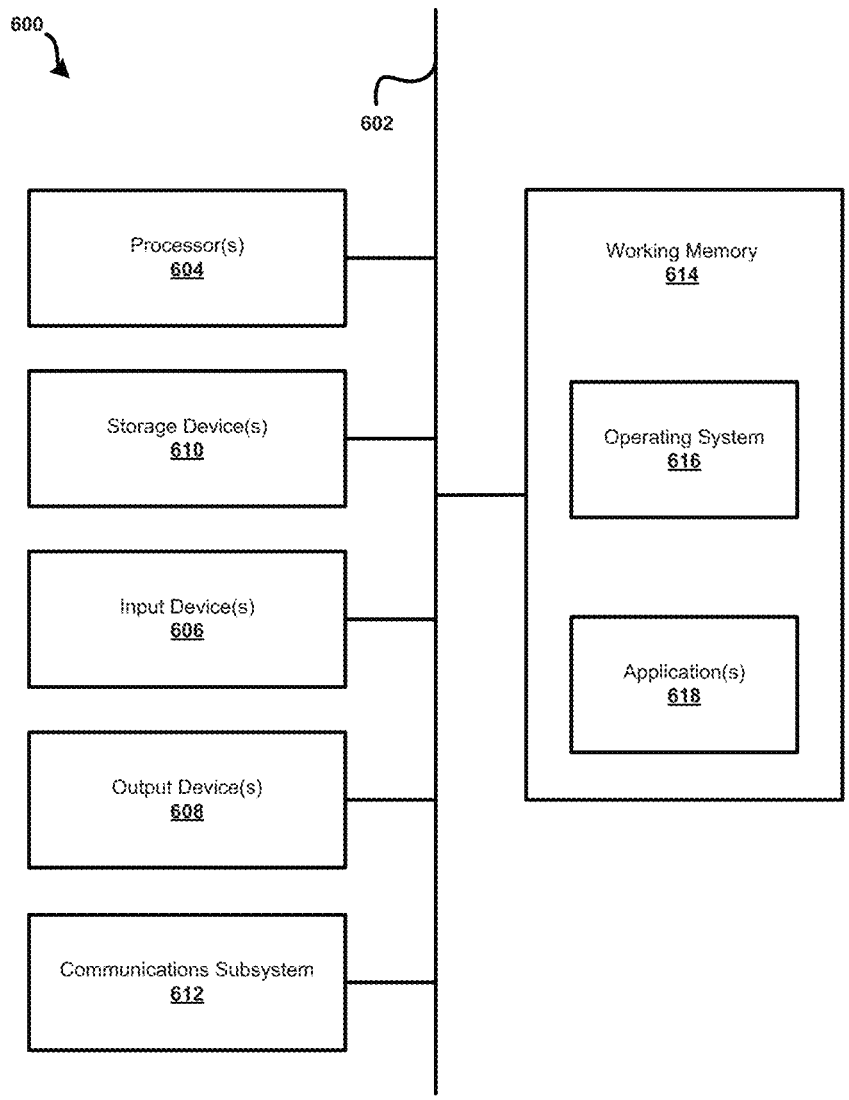
FIG. 6 shows an example computing system or device.

FIG. 6 shows an example computer system or device 600 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. The computer system 600 may be wholly or at least partially incorporated as part of previously-described computing devices, such as the service provider 102, a PTR 110, STRs 112*a-b*, televisions 114*a-c*, and computing devices 116*a-b* of at least FIG. 1. Further, the example computer device 600 may be configured to perform and/or include instructions that, when executed, cause the computer system 600 to perform the method of FIG. 4. Still further, the example computer device 600 may be configured to perform and/or include instructions that, when executed, cause the computer system 600 to instantiate and implement functionality of the LPE module 118 of at least FIG. 1.

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation or display device, e.g., television, printer, and/or the like.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 might also include a communications subsystem 612, which may include without limitation a modem, a network card (wireless or wired), an infrared communication device, a wireless communication device, and/or a chipset (such as a Bluetooth™ device, an 602.11 device, a WiFi device, a WiMax device, cellular communication facilities (e.g., GSM, WCDMA, LTE, etc.), and/or the like. The communications subsystem 612 may permit data to be exchanged with a network (such as the network described below, to name one example), other computer systems, and/or any other devices described herein. In many examples, the computer system 600 will further comprise a working memory 614, which may include a random access memory and/or a read-only memory device, as described above.

The computer device 600 also may comprise software elements, shown as being currently located within the working memory 614, including an operating system 616, device drivers, executable libraries, and/or other code, such as one or more application programs 618, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 600) to perform methods in accordance with various examples of the disclosure. According to a set of examples, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    storing, at a television receiver, a listing that specifies one or more approved transponder identifiers and one or more signal strengths corresponding to one or more satellite transponders signals from one or more satellite transponders, the one or more satellite transponders signals comprising one or more satellite broadcast television signals, wherein the television receiver only decodes transmissions from the one or more satellite transponders corresponding to the specified one or more approved transponder identifiers and does not decode transmissions from other satellite transponders;
    detecting, by the television receiver, the one or more satellite transponders signals from the one or more satellite transponders corresponding to the specified one or more approved transponder identifiers and one or more additional satellite transponders signals from one or more additional satellite transponders;
    receiving, at the television receiver, a command from a service provider to access the listing stored at the television receiver;
    querying, based on the command, a memory location of the television receiver that is associated with the listing, to obtain each transponder identifier and associated signal strength within the listing; and
    initiating a transmission process to cause transmission of a message that includes a representation of at least two transponder identifiers and associated signal strengths for transmission over a network interface of the television receiver to a computing system that is configured to estimate a geographic location of the television receiver based on the at least two transponder identifiers and associated signal strengths, where:
        the at least two transponder identifiers comprises: at least one transponder identifier corresponding to the one or more satellite transponders, and at least one transponder identifier corresponding to the one or more additional satellite transponders detected; and
        when the message is not successfully transmitted after a predetermined passage of time, a smartcard of the television receiver is disabled to disrupt service.

2. The method of claim 1, further comprising transmitting the message over the network interface of the television receiver to the computing system that is configured to estimate geographic location of the television receiver based on each transponder identifier within the listing.

3. The method of claim 2, further comprising receiving, by the television receiver from the computing system, confirmation of receipt of the message by the computing system.

4. The method of claim 2, further comprising receiving by the television receiver an indication of unsuccessful transmission of the message to the computing system.

5. The method of claim 4, further comprising retransmitting the message over the network interface in response to passage of a predetermined time period following receiving the indication of unsuccessful transmission of the message to the computing system.

6. The method of claim 4, further comprising generating by the television receiver a warning message for transmission over a television interface of the television receiver to a television that is configured to output for display the warning message to prevent unintended service disruption.

7. The method of claim 4, further comprising disabling by the television receiver the smartcard of the television receiver following passage of the predetermined passage of time to disrupt service.

8. The method of claim 1, further comprising receiving by the television receiver from the computing system an entitlement control message, and extracting the command to access the listing from the entitlement control message.

9. A television receiver, comprising:
    at least one processor that stores, in a memory location of the television receiver, a list that specifies one or more approved transponder identifiers and one or more signal strengths corresponding to one or more satellite transponders signals from one or more satellite transponders, the one or more satellite transponders signals comprising one or more satellite broadcast television signals, wherein the television receiver only decodes transmissions from the one or more satellite transponders corresponding to the specified one or more approved transponder identifiers and does not decode transmissions from other satellite transponders;
    a smartcard that is coupled to the at least one processor and that receives an instruction from a service provider to access the list stored in the memory location of the television receiver; and
    a network interface that is coupled to the at least one processor and the smartcard;
    wherein the at least one processor initiates a transmission process to cause transmission of a secure message a representation of at least two transponder identifiers and associated signal strengths associated with each of the at least two transponder identifiers over a network to a computing system that estimates a geographic location of the television receiver based on the at least two transponder identifiers and associated signal strengths, where the at least two transponder identifiers comprises: at least one transponder identifier corresponding to the one or more satellite transponders, and at least one transponder identifier corresponding to one or more additional satellite transponders detected;
    wherein the television receiver detects the one or more satellite transponders signals from the one or more satellite transponders corresponding to the specified one or more approved transponder identifiers and one or more additional satellite transponders signals from the one or more additional satellite transponders; and
    wherein, when the secure message is not successfully transmitted after a predetermined passage of time, the smartcard is disabled to disrupt service.

10. The television receiver of claim 9, wherein the network interface receives, from the computing system, confirmation of receipt of the secure message by the computing system.

11. The television receiver of claim 9, wherein the smartcard receives, from the computing system, confirmation of receipt of the secure message by the computing system.

12. The television receiver of claim 9, wherein the network interface retransmits the secure message following receipt of an indication, by the television receiver, of unsuccessful transmission of the secure message to the computing system.

13. The television receiver of claim 9, further comprising a television interface that is coupled to the at least one processor and that transmits a warning message to a television that outputs for display the warning message to prevent unintended service disruption.

14. The television receiver of claim 9, wherein the smartcard self-disables to disrupt processing of television programming for output by the television receiver.

15. A non-transitory, processor-readable medium comprising processor-readable instructions to cause one or more processors to:

store, at a television receiver, a listing that specifies one or more approved transponder identifiers and one or more signal strengths corresponding to one or more satellite transponders signals from one or more transponders, the one or more satellite transponders signals comprising one or more satellite broadcast television signals, wherein the television receiver only decodes transmissions from the one or more satellite transponders corresponding to the specified one or more approved transponder identifiers and does not decode transmissions from other satellite transponders;

detect the one or more satellite transponders signals from the one or more satellite transponders corresponding to the specified one or more approved transponder identifiers and one or more additional satellite transponders signals from one or more additional satellite transponders;

detect receipt of a command from a service provider at the television receiver to query the listing stored at the television receiver; and initiate transmission of a secure message that includes a representation of at least two transponder identifiers and associated signal strengths over a network interface to a computing system that is configured to estimate a geographic location of the television receiver based on the at least two transponder identifiers and associated signal strengths, where the at least two transponder identifiers comprises: at least one transponder identifier corresponding to the one or more satellite transponders, and at least one transponder identifier corresponding to the one or more additional satellite transponders;

wherein, when the secure message is not successfully transmitted after a predetermined passage of time, a smartcard of the television receiver is disabled to disrupt service.

16. The non-transitory, processor-readable medium of claim 15, further comprising processor-readable instructions to cause the one or more processors to detect confirmation of receipt of the secure message by the computing system.

17. The non-transitory, processor-readable medium of claim 15, further comprising processor-readable instructions to cause the one or more processors to detect an indication of unsuccessful transmission of the secure message to the computing system.

18. The non-transitory, processor-readable medium of claim 17, further comprising processor-readable instructions to cause the one or more processors to initiate retransmission of the secure message in response to passage of a predetermined time period following detection of the indication of unsuccessful transmission of the secure message to the computing system.

19. The non-transitory, processor-readable medium of claim 15, further comprising processor-readable instructions to cause the one or more processors to generate a warning message for transmission over a television interface to a television that is configured to output for display the warning message to prevent unintended service disruption.

20. The non-transitory, processor-readable medium of claim 15, further comprising processor-readable instructions to cause the one or more processors to disable the smartcard of the television receiver following passage of the predetermined passage of time to disrupt one or more services of the television receiver.

* * * * *

UNITED STATES PATENT AND TRADEMARK OFFICE
CERTIFICATE OF CORRECTION

PATENT NO. : 10,171,871 B2
APPLICATION NO. : 14/532398
DATED : January 1, 2019
INVENTOR(S) : Erik Joseph Swenson Page 1 of 1

It is certified that error appears in the above-identified patent and that said Letters Patent is hereby corrected as shown below:

In the Claims

In Column 26, Claim 15, Line 11, please insert the word -- detected -- after the word "transponders" and before the ";"

Signed and Sealed this
Seventh Day of May, 2019

Andrei Iancu
*Director of the United States Patent and Trademark Office*